United States Patent Office 3,578,648
Patented May 11, 1971

3,578,648
PROCESS FOR THE PREPARATION OF VINYL CHLORIDE POLYMERS
Susumu Taima and Shigeo Nakada, Uozu-shi, Japan, assignors to Nippon Carbide Kogyo Kabushiki Kaisha, Tokyo, Japan
No Drawing. Filed Nov. 22, 1968, Ser. No. 778,299
Claims priority, application Japan, June 18, 1968, 43/41,661
Int. Cl. C08f 1/13, 3/30, 15/00
U.S. Cl. 260—87.5                                   8 Claims

ABSTRACT OF THE DISCLOSURE

Emulsion type polymerization of vinyl chloride in an aqueous medium in the presence of a polymerization initiator is divided into two steps: the first step of polymerizing monomers to prepare polymers suitable as seeds and the second step of polymerizing fresh monomers using the above polymers as seeds to produce the final product polymers. And in each of the both steps respectively, is used a specified emulsifier system comprising (a) a higher fatty acid of carbon number of 10–18, (b) a high molecular surface active agent represented by the formula $$HO(CH_2CH_2O)_m(CHCH_3CH_2O)_p(CH_2CH_2O)_nH$$

and (c) disodium phosphate or sodium bicarbonate. The final product polymers require no salting-out procedure and can be readily dehydrated. And the polymers can form a plastisol which shows a very low viscosity and is excellent in age stability, heat-stability and transparency. Thus the polymers are quite suitable for paste resins.

---

The present invention relates to a process for the preparation of vinyl chloride polymers, which comprises polymerizations of vinyl chloride monomers in an aqueous medium with use of specified emulsifiers to produce polymers, plastisols prepared therefrom having desirable flowing properties.

More particularly, the present invention relates to a process for the preparation of vinyl chloride polymers, which comprises a polymerization of vinyl chloride monomers (herein vinyl chloride monomers means not only vinyl chloride homomonomers but also monomeric mixtures of 70–100 parts by weight of vinyl chloride monomers and 30–0 parts by weight of other monomers copolymerizable with vinyl chloride) in an aqueous medium in the presence of a water-soluble polymerization initiator (hereinafter the said polymerization will be referred to as seed polymerization and polymers obtained in the said polymerization will be referred to as seed polymers) and a further polymerization of vinyl chloride monomers, using the said seed polymers as seeds, in an aqueous medium in the presence of a water-soluble polymerization initiator (hereinafter the said polymerization will be referred to as seeded polymerization and polymers obtained in the said polymerization will be referred to as seeded polymers), in each of the both polymerizations a combination of emulsifiers; higher fatty acid, high molecular surface active agent and inorganic salt, which will be further specified being used (hereinafter such a combination of emulsifiers will be referred to as an emulsifier system).

An object of the present invention is to provide vinyl chloride polymers, which can form plastisol or organosol (hereinafter referred to as sol simply) having low viscosity, being excellent in age-stability and heat-stability and showing desirable flowing properties.

Another object is to provide a process of preparing vinyl chloride polymers by emulnion type polymerization conveniently and economically, that is, salting-out procedure is not necessary and yet the produced polymers can be readily separated from the polymerization mother liquor and thereafter cake of the polymers can be readily dried in a similar way as in the ordinary suspension type polymerization of vinyl chloride.

In general, the most important property requested to the plastisol obtained by mixing a vinyl chloride polymer prepared by emulsion type polymerization with a plasticizer is a low viscosity of the sol to give desirable flowing properties. There has been a number of proposals in order to improve this property, for example, Seeding Polymerization Process (Japanese patent application publication No. 6,493/1951) and Process of Divided Addition of Emulsifier and Vinyl Chloride Monomers During Polymerization Reaction (Japanese patent application publication No. 4,939/1953). These processes employ the conventional emulsion polymerization methods using ordinary emulsifiers and vinyl chloride polymers are obtained as aqueous dispersions. Therefore, in order to obtain vinyl chloride polymers from these aqueous dispersions in solid powdery form, these prior processes are compelled to employ troublesome procedures either of salting-out followed by suitable drying or direct spray drying of the dispersion. In the prior emulsion type polymerization processes, however, it is necessary to use a large amount of emulsifier or to use an expensive emulsifier of high emulsifying power, because the processes usually aim at providing a stable emulsion while avoiding destruction or precipitation of the aqueous dispersion of vinyl chloride polymers after polymerization is completed. Therefore, if the former, salting-out drying procedure, is employed, a large amount of salting-out agent becomes necessary in salting-out step and in addition the equipments need to be complicated. Further energy required is much in drying step because polymers after dehydration still retain high water-content due to difficulties in dehydration operation. These are disadvantages of the prior emulsion type polymerization processes.

Furthermore, polymers after drying still contain a lot of emulsifier as well as salting-out agent, which causes damages in processibility, heat-stability and/or transparency and thus reduces the commercial value of the final products. Attempts to remove such undesirable emulsifiers and salting-out agents from polymers are again commercially disadvantageous, because rinsing with water or with other solvents requires much labor and time and brings much loss of solvents.

In the other procedure, spray drying, more energy is required than in the above salting-out procedure and the whole amount of used emulsifier always accompanies the polymers undesirably. Therefore the procedure is also commercially disadvantageous as the salting-out procedure, and inevitably reduces the qualities of the polymers.

The present invention has solved all of the technical problems as mentioned above which are inevitablly encountered in the prior emulsion polymerization processes.

We have found unexpectedly in the course of the investigations on paste resins that if we conduct first a seed-polymerization of vinyl chloride monomers in an aqueous medium in the presence of a water-soluble polymerization initiator with the use of an emulsifier system comprising (a) 0.03–0.25 parts by weight of a higher fatty acid of carbon number of 10–18 per 100 parts by weight of vinyl chloride monomers, (b) 0.03–0.25 part by weight of a high molecular surface active agent represented by the formula $$HO(CH_2CH_2O)_m(CHCH_3CH_2O)_p(CH_2CH_2O)_nH$$

per 100 parts by weight of vinyl chloride monomers and ($c_1$) 0.5–5 mols of disodium phosphate per 1 mol of (a) component to prepare seed polymers, and transfer the seed polymers into a seeded polymerization vessel and conduct a seeded polymerization of fresh vinyl chloride monomers using the seed polymers as seeds in an aqueous medium in the presence of a water-soluble polymerization initiator with the use of an emulsifier system comprising 0.03–0.25 part by weight of the said (a) component per 100 parts by weight of vinyl chloride monomers, 0.03–0.25 part by weight of the said (b) component per 100 parts by weight of vinyl chloride monomers and ($c_2$) 0.5–5 mols of sodium bicarbonate per 1 mol of (a) component to produce the final vinyl chloride polymers, there can be obtained the final product polymers which do not require salting-out procedure, are excellent in separation from polymerization mother liquor (degree of dehydration). The polymers can form a sol showing a very low viscosity and are suitable for paste resins.

Further, in the continued investigations, we have found that when the said ($c_1$) component and the said ($c_2$) component are replaced with each other in the above two-step polymerization process or when the same component either ($c_1$) or ($c_2$) is used in the both steps (i.e. the same system of emulsifier is used in the seed and seeded polymerizations), though the processes are inferior to some extent to the above original process in that there is observed a tendency of forming small agglomerates (which causes difficulties in operation), yet they are remarkably superior to the prior processes.

The comonomers copolymerizable with monomeric vinyl chloride which may be used in the present invention include vinylidene chloride, alkyl vinyl esters, alkyl vinyl ethers, alkyl acrylates, alkyl methacrylates, alkyl unsaturated dibasic acid esters and olefins such as ethylene and propylene. The water-soluble polymerization initiator includes potassium persulfate, ammonium persulfate, hydrogen peroxide and the like which are conventionally used in emulsion polymerizations and also so-called redox catalysts consisting of such a peroxide and a reducing agent.

In the present invention, polymerization is divided into two steps, in each of which the essential condition is to use an emulsifier system comprising three components: the first component (a), the second component (b) and the third component (c). Thus, a plastisol prepared from the final product polymers shows a surprisingly low viscosity and desirable flowing properties and are excellent in age-stability, heat-stability and transparency. The final product polymers are readily dehydrated and dried.

In order to illustrate the novelty and utility of the present invention, a typical example of the present invention is compared with several reference examples including the conventional formulations of emulsion type polymerization in Tables 1 and 2.

EXAMPLE 1 AND REFERENCE EXAMPLES 1–15

The conditions and results are described in Tables 1 and 2. The other condition of polymerization (formulation and procedure) were according to the description preceding the Example 2.

TABLE 1

Seed polymerization

| | Emulsifier system | | 3rd component, disodium phosphate | | | |
|---|---|---|---|---|---|---|
| | 1st component (parts by weight) | 2nd component (parts by weight) | Parts by weight | Molar ratio | State of product | Sol viscosity, poise |
| Example 1 | Lauric acid (0.12) | Pronon-102- (0.12) | 0.42 | 2 | Emulsion | 1,853. |
| Reference Example: | | | | | | |
| 1 | Sodium laurate (0.12) | do | | | do | Too high to be measured. |
| 2 | do | do | 0.21 | | do | Do. |
| 3 | Lauric acid (0.12) | do | 0.42 | 2 | do | 1,853. |
| 4 | do | do | 0.42 | 2 | do | 1,853. |
| 5 | Sodium laurate (0.12) | do | 0.21 | | do | Too high to be measured. |
| 6 | Emal 2F (0.12) | do | 0.21 | | do | Do. |
| 7 | Rapisol B80 (0.12) | do | 0.21 | | do | Do. |
| 8 | do | Emulgen-904- (0.12) | 0.21 | | do | Do. |
| 9 | Emal 2F (0.5) | Emasol-110- (0.7) | | | do | Do. |
| 10 | do | Pronon-102- (0.12) | 0.21 | | do | Do. |
| 11 | Lauric acid (0.12) | do | 0.42 | 2 | do | 1,853. |
| 12 | Rapisol B80 (0.12) | Emulgen-904- (0.12) | 0.21 | | do | Too high to be measured. |
| 13 | Lauric acid (0.12) | Pronon-102- (0.12) | 0.42 | 2 | do | 1,853. |

Seeded polymerization

| | Emulsifier system | | 3rd component, sodium bicarbonate | | Seed polymers (parts by weight) | State of product | Degree of dehydration (percent) | Sol viscosity | |
|---|---|---|---|---|---|---|---|---|---|
| | 1st component (parts by weight) | 2nd component (parts by weight) | Parts by weight | Molar ratio | | | | R.p.m. | Poise |
| Example 1 | Lauric acid (0.12) | Pronon-102- (0.12) | 0.10 | 2 | 3 | Salting-out unnecessary. | 82 | 2 | 83 |
| | | | | | | | | 4 | 70 |
| | | | | | | | | 10 | 60 |
| | | | | | | | | 20 | 65 |
| Reference Example: | | | | | | | | | |
| 1 | Sodium laurate (0.12) | do | | | 3 | Salting-out necessary | 38 | 2 | 292 |
| | | | | | | | | 4 | 230 |
| | | | | | | | | 10 | 190 |
| | | | | | | | | 20 | 165 |
| 2 | do | do | 0.05 | | 3 | do | 40 | 2 | 300 |
| | | | | | | | | 4 | 239 |
| | | | | | | | | 10 | 201 |
| | | | | | | | | 20 | 180 |
| 3 | do | do | | | 3 | do | 42 | | 368 |
| 4 | do | do | 0.05 | | 3 | do | 40 | | 458 |
| 5 | Lauric acid (0.12) | do | 0.10 | 2 | 3 | do | 45 | | 465 |
| 6 | Emal 2F (0.12) | do | 0.05 | | 3 | do | 35 | | 1,185 |
| 7 | Rapisol B80 (0.12) | do | 0.05 | | 3 | do | 33 | | 695 |
| 8 | do | Emulgen-904- (0.12) | 0.05 | | 3 | do | 37 | | 1,007 |
| 9 | Emal 2F (0.5) | Emasol-110- (0.7) | | | 3 | do | 32 | Too high to be measured | |
| 10 | Lauric acid (0.12) | Pronon-102- (0.12) | 0.10 | 2 | 3 | do | 40 | | 735 |
| 11 | Rapisol B80 (0.12) | do | 0.05 | 1 | 3 | do | 36 | | 463 |
| 12 | Lauric acid (0.12) | do | 0.10 | 2 | 3 | do | 35 | | 703 |
| 13 | Emal 2F (0.5) | Emasol-110- (0.7) | | | 3 | do | 33 | | 1,250 |

NOTE:
Emal 2F (Registered trade mark; made by Kao Sekken K.K.): Sodium lauryl sulfate.
Rapisol B80 (Registered trade mark; made by Nippon Yushi K.K.): Sodium octyl sulfosuccinate.
Emulgen-904- (Registered trade mark; made by Kao Sekken K.K.): Polyoxyethylene nonylphenol ether.
Emasol-110- (Registered trade mark; made by Kao Sekken K.K.): Sorbitan monolaurate.
Pronon-102- (Registered trade mark; made by Nippon Yushi K.K.): A high molecular surface active agent represented by the formula $HO(CH_2CH_2O)_m(CHCH_3CH_2O)_p(CH_2CH_2O)_nH$ where $m$ is 2–3, $n$ is 2–3 and $p$ is 16–18.
Degree of dehydration
Plastisol viscosity } Determined according to the test methods described later preceding the Example 2.

TABLE 2

Polymerization by divided addition of materials

| | | Emulsifier system | | 3rd component, disodium phosphate | | | | | |
|---|---|---|---|---|---|---|---|---|---|
| | Initiator, potassium persulfate (parts by weight) | 1st component, lauric acid (parts by weight) | 2nd component, Pronon-102- (parts by weight) | Parts by weight | Molar ratio | Vinyl chloride monomer added (parts by weight) | State of product | Degree of dehydration (percent) | Solution viscosity, poises |
| Reference Example: | | | | | | | | | |
| 14 | Start :0.02; 5 hrs. :0.02; 7 hrs. :0.02; 9 hrs. :0.02. | Start :0.025; 5 hrs. :0.025; 7 hrs. :0.025; 9 hrs. :0.025; 11 hrs. :0.02. | Start :0.025; 5 hrs. :0.025; 7 hrs. :0.025; 9 hrs. :0.025; 11 hrs. :0.02. | 0.42 | [1] 2 | Start :30 parts; After 2 hrs.: 70 parts were totally added in the rate of 7 parts/hr. | Salting-out unnecessary. | 73 | 2,640 |
| 15 | Start :0.0024; After 10 hrs. :0.08. | Start :0.0036; After 10 hrs. :0.12. | Start :0.0036; After 10 hrs. :0.12. | Start :2 mol; After 10 hrs. :2 mol. | | Start :3; After 10 hrs. :100. | ----do---- | 75 | 1,036 |

[1] Two mols were added initially per total lauric acid.

Tables 1 and 2 are given explanations as follows:

(1) Reference Examples 11 and 13 are the examples where the emulsifier system in the seed polymerization satisfies the requirements of the present invention, but in the seeded polymerization, is used a system of an unspecified anionic surface active agent and an unspecified non-ionic surface active agent (Reference Example 13), or a system of an unspecified anionic surface active agent, and a non-ionic surface active agent and an inorganic salt the both of which satisfy the requirements of the present invention (Reference Example 11).

(2) Reference Examples 10 and 12 are the examples, where an emulsifier system of an unspecified anionic surface active agent, and a non-ionic surface active agent and an inorganic salt the both of which satisfy the requirements of the present invention (Reference Example 10), or a system of an unspecified anionic surface active agent and an unspecified non-ionic surface active agent and an inorganic salt which satisfies the requirements of the present invention (Reference Example 12) is used in the seed polymerization, and an emulsifier system which satisfies the requirements of the present invention is used in the seeded polymerization.

(3) Reference Examples 8 and 9 are the examples, where a system of an unspecified anionic and an unspecified non-ionic surface active agent (Reference Example 9), or a system of the said two agents and an inorganic salt which satisfies the requirements of the present invention (Reference Example 8) is used.

(4) Reference Examples 6 and 7 are the examples, where a system of an unspecified anionic surface active agent, and a non-ionic surface active agent and an inorganic salt the both of which satisfy the requirements of the present invention.

(5) Reference Examples 5, 10 and 12 are the examples, where the emulsifier system in the seeded polymerization satisfies the requirements of the present invention, but the emulsifier system in the seed polymerization does not satisfy the requirements of the present invention.

(6) Reference Examples 3 and 4 are the examples, where the emulsifier system in the seed polymerization and the second component of the emulsifier system in the seeded polymerization satisfy the requirements of the present invention, but a fatty acid soap which is generally assumed to be produced through the interaction of the first component acid and the third component base of the present invention is used as an anionic surface active agent.

(7) Reference Examples 1 and 2 are the examples, where the emulsifier system in the seed polymerization does not satisfy the requirements of the present invention in addition to the unsatisfaction of the above paragraph (6).

(8) Example 1 is the example, where all the requirements of the present invention are satisfied in both seed polymerization and seeded polymerization.

(9) Reference Examples 14 and 15 in Table 2 are the examples, where the first and the second components of the emulsifier system of the present invention, the vinyl chloride monomers and the polymerization initiator are added dividedly in one-step polymerization instead of adopting two-step polymerization of the present invention.

Vinyl chloride polymers prepared in the Reference Examples described above require salting-out procedure, are low in the degree of dehydration and very high in sol viscosity and therefore are unsatisfactory from the technical and commercial points of view, whereas the results in Example 1 are apparently very satisfactory.

In addition, it is apparent from the results of Reference Examples 3 and 4 that the first and the third components of the emulsifier system in the present invention does not form simply a fatty acid soap.

It is the essential requirements of the present invention to use an emulsifier system comprising the three components specified above in the both of seed and seeded polymerization steps. Exclusively by satisfying all of the requirements of the present invention, it is possible to improve sol viscosity, sol age-stability, heat-stability and transparency at the same time and further to manufacture vinyl chloride polymers in an emulsion type polymerization process, where salting-out step is eliminated, dehydration is easy and economical drying can be applied, all of which have been considered to be technical problems in the prior emulsion type polymerization.

Further explanations on the three components are given as follows:

(a) Higher fatty acids of carbon number 10–18: for examples, lauric acid, myristic acid, stearic acid, oleic acid and mixtures thereof can be used. The amount of higher fatty acid used in the present invention is 0.03–0.25 part by weight of vinyl chloride monomers. When carbon number of the fatty acid is less than 10, polymers obtained in the seeded polymerization are either of high sol viscosity or of no sol forming ability. When the amount of the fatty acid added is either less than 0.03 part by weight or more than 0.25 part by weight, the sol viscosity becomes high. When the first component is singly used in the seed polymerization within the range of amount defined in the present invention, most of the seed polymers form hard globular polymers of 5 mm. in average diameter and therefore the polymers can not be used as seed polymers. In case that seed polymers are prepared with an emulsifier system of the present invention and then seeded polymerization is conducted using only the first component, small agglomerates of polymers are formed in a large quantity, and the polymers can not form a sol. When the first component is singly used in a large amount (for instance more than 1.0 part by weight), polymers produced can form a sol but the sol is unsuitable because of very high viscosity.

(b) The high molecular surface active agent: is specified by the general formula $$HO(CH_2CH_2O)_m(CHCH_3CH_2O)_p(CH_2CH_2O)_nH$$

for preferable example, Pronon (registered trademark) made by Nippon Yushi K.K. Pronon is represented by a formula $$HO(CH_2CH_2O)_m(CHCH_3CH_2O)_p(CH_2CH_2O)_nH$$

where $m$ is 2–16, $n$ is 2–16 and $p$ is 16–35.

The amount to be added is 0.03–0.25 part by weight per 100 parts by weight of vinyl chloride monomers. When the amount of the surface active agent added is either less than 0.03 part by weight or more than 0.25 part by weight, the sol viscosity of seed polymers increases. When this second component is excluded from the present emulsifier system, sol viscosity increases and, especially, heat-stability of polymers becomes very poor. In case that this second component is singly used in seed polymerization, globular or small agglomerate polymers are produced in a large quantity, and the polymers can not be used as seed polymers. When seed polymers are prepared with the emulsifier system of the present invention and the second component of the present emulsifier system is singly used in seeded polymerization, globular or small agglomerate polymers are produced in a large quantity, and the polymers have no sol forming ability at all. When unspecified non-ionic or anionic emulsifier, higher alcohol or fatty acid ester is used instead of the second component, either high sol viscosity or poor heat-stability is resulted.

(c) Disodium phosphate or sodium bicarbonate: The amount to be added is 0.5–5 mols per 1 mol of the first component (a). When a salt other than the above, for examples, sodium carbonate, trisodium phosphate, monosodium phosphate, sodium sulfate or sodium acetate is used, the viscosity of sol formed from the seeded polymers becomes high. When the amount is less than 0.5 molar ratio, sol viscosity is high and undesirable small agglomerate or globular polymers are produced in a large quantity. Also when the molar ratio exceeds 5, the sol viscosity increases again. In case that the third component is eliminated from the emulsifier system of the present invention in seed polymerization, small agglomerate or globular polymers are produced in a large quantity and the polymers can not be used as seed polymers. Also when seed polymers are prepared using the emulsifier system of the present invention and seeded polymerization is conducted using an emulsifier system that lacks only the third component, small agglomerate or globular polymers are produced in a large quantity and the polymers have no sol forming ability.

Especially when disodium phosphate is used as the third component in seed polymerization and sodium bicarbonate is used as the third component in seeded polymerization, the results are the most favorable, because the degree of dehydration is good, no small agglomerates are formed at all and the sol viscosity is very low. In the other cases of the present invention, formation of small agglomerates tends to occur.

The pH of the aqueous medium (hereinafter referred to as polymerization medium) containing an emulsifier system of the present invention before the starting of polymerization is approximately 7–9. Even if the pH of the polymerization medium is adjusted in the above range with the use of an emulsifier system which does not satisfy the requirements of the third component, no desirable polymers can be obtained.

According to the present invention, even though an emulsifier system described above is used, polymers of low viscosity and high degree of dehydration and being readily dried can not be obtained, unless the polymerization is divided into two steps: seed polymerization and seeded polymerization.

The amount of seed polymers to be added is usually 2–7 parts by weight per 100 parts of fresh vinyl chloride monomers. The present invention can be practiced with ordinary procedures and ordinary apparatuses for polymerization of vinyl chloride monomers. If necessary, chain transfer agents may be used.

The polymerization temperature is usually below 100° C. and is preferably 70–30° C.

Further advantages of the present invention will be apparent from the following examples and reference examples. The tests for vinyl chloride polymers obtained in the examples and reference examples were carried out by the following methods:

(1) DEGREE OF DEHYDRATION

The product of polymerization is treated with a centrifugal dehydrator. The polymers are discharged after no longer appreciable drops of water drain out through drain pipe of the dehydrator. A given amount (A gm.) of the cake of polymers discharged is dried in a thermostat dryer at 105° C. until a constant weight (B gm.) The degree of dehydration is calculated by the following equation.

$$\text{Degree of Dehydration (percent)} = \left(1 - \frac{A-B}{B}\right) \times 100$$

(2) PLASTISOL VISCOSITY

One hundred parts by weight of vinyl chloride polymers and 55 parts by weight of di-2-ethylhexyl phthalate (hereinafter referred to as DOP) are subjected to mixing at 30° C.±1° C. for 20 minutes with Ishikawa-type kneader (type No. 18 equipped with jacket). A sol obtained is put into a beaker and its plastisol viscosity is measured with a Brookfield-type viscometer at 30° C. ±1° C. and is expressed by reading for four revolutions at three minutes after the rotor starts to move.

(3) AGE-STABILITY OF PLASTISOL VISCOSITY

A sol is prepared in exactly the same way as in the above Plastisol Viscosity measurement except that 100 parts by weight of vinyl chloride polymers are mixed with 60 parts by weight of DOP. The sol is left to stand at room temperature. The viscosity is measured at 30° C.±1° C. on the 1st, 2nd, 5th, 7th, 12th and 14th day and is expressed as viscosity for 4 revolutions.

(4) HEAT-STABILITY

A sol is prepared by the same way as in the above two paragraphs except that 100 parts by weight of vinyl chloride polymers are mixed with 67 parts by weight of DOP and 3 parts by weight of S–62–J (trade name, make by Katsuta Kako, a barium-cadmium-zinc organo-complex). The sol is defoamed with a vacuum defoamer and then is heated at 190° C. for 10 minutes to prepare cast films of 0.7 mm. in thickness. The cast films are tested at 180° C. with a gearoven. The measure of heat-stability is referred to by coloration observed with eyes of each sample left for 10, 20, 40, 60 and 80 minutes, respectively. When vinyl chloride polymers are extremely poor in heat-stability, they color already at the time when they are made into plastisols. Therefore, coloration of sol as prepared is also observed with eyes and recorded if any.

(5) TRANSPARENCY

Cast films of 1 mm. in thickness are prepared from the formulation described in the above paragraph 4 and haze value (percent) is determined with integrating ball type H.T.R. meter (Photoelectrometer: made by Nippon Seimitsu Kogaku K.K.).

In the following examples and reference examples, polymerization was conducted with the formulation and procedure as below unless otherwise specified.

Vinyl chloride-monomers—100 parts by weight
Water—200 parts by weight
Potassium persulfate—0.08 part by weight
Emulsifier—Referred in each example and reference example
Seed polymers—Emulsion as it is after seed polymerization is completed is used. The amount used is referred by amount of solid contents After the above water, polymerization initiator and emulsifier system are charged into a stainless steel polymerization vessel equipped with a stirrer (seed polymers are also charged in the step of seeded polymerization), oxygen in the polymerization system is removed substantially completely. Then monomers are pressed into the vessel, stirred and heated until the temperature of the content of the vessel reaches 53° C., and thereafter the temperature is maintained by heating or cooling. When the pressure in the polymerization vessel drops, the polymerization is terminated and the content is discharged. Thereafter the polymers are dehydrated and separated with a centrifugal dehydrator and then are dried.

EXAMPLES 2–4 AND REFERENCE EXAMPLE 16

(Described in Table 3)

The results shown in Table 3 demonstrate that sol viscosity is very high in case that capric acid, not satisfying our specified carbon number, is used in place of the first component of the emulsion system of the present invention.

Tables 4, 5 and 6 show the results of the comparison experiments, in which vinyl chloride polymers obtained in the present invention are compared with commercial vinyl chloride polymers for paste resins according to the test methods previously described.

The results shown in Tables 4, 5 and 6 clearly demonstrate that vinyl chloride polymers obtained in the present invention are excellent in properties, particularly in heat-stability, age-stability of plastisol viscosity and transparency.

TABLE 6.—TRANSPARENCY

|  | Example 1 | Commercial product A | Commercial product C |
|---|---|---|---|
| Total transmission (percent) | 92 | 85 | 91 |
| Haze value (percent) | 4.4 | 7.6 | 8.7 |

EXAMPLE 5 AND REFERENCE EXAMPLES 17–25 (Described in Table 7)

The results shown in Table 7 clearly demonstrate that in case that the second component of the emulsifier system of the present invention is replaced by a non-ionic other than ours, or an anionic or the other type emulsifier, sol viscosity and heat-stability of the final product polymers are very unsatisfactory.

In Reference Example 24, the second component of the emulsifier system of the present invention is replaced by a non-ionic emulsifier other than ours in the seed polymerization and the emulsifier system of the present invention is used in the seeded polymerization. In Reference Example 25, the emulsifier system of the present invention is used in the seed polymerization and the second component of the emulsifier system of the present invention is replaced by a non-ionic emulsifier other than ours

TABLE 3

| | Emulsifier system | | | | | | Seed polymerization | | | | |
|---|---|---|---|---|---|---|---|---|---|---|---|
| | 1st component (parts by weight) | 2nd component, Pronon -201- (parts by weight) | 3rd component, molar ratio | | State of product | Solution viscosity, poise | Seed polymers (parts by weight) | State of product | Degree of dehydration (percent) | Solution viscosity, poise |
| | | | Disodium phosphate | Sodium bicarbonate | | | | | | |
| Example: | | | | | | | | | | |
| 2 | Lauric acid 0.05. | 0.05 | 5 | 5 | Emulsion | 1,050 | 5 | Salting-out unnecessary. | 80 | 73 |
| 3 | Stearic acid 0.12. | 0.12 | 2 | 2 | ...do... | 1,530 | 3 | ...do... | 82 | 65 |
| 4 | Oleic acid 0.12. | 0.12 | 2 | 2 | ...do... | 2,035 | 3 | ...do... | 80 | 71 |
| Reference Example 16. | Capric acid 0.12. | 0.12 | 2 | 2 | Ununiform particles. | ¹1,370 | 3 | ...do... | 65 | 1,150 |

¹ Solution sedimented.

TABLE 4.—HEAT-STABILITY

| Minutes | 10 | 20 | 30 | 40 | 60 | 80 |
|---|---|---|---|---|---|---|
| Example 1 | White | White | White | White | Light brown | Brown. |
| Commercial product A | do | Light reddish-brown. | Reddish-brown. | Dark brown. | Black | Black. |
| Commercial product B | Light yellow | Light yellow | Yellow | Light brown | ...do... | Do. |

TABLE 5.—AGE-VARIATION OF PLASTISOL VISCOSITY

| | Centipoise | | | | | |
|---|---|---|---|---|---|---|
| Days | 1 | 2 | 5 | 7 | 10 | 14 |
| Example 1 | 3,600 | 5,200 | 5,800 | 6,000 | 6,200 | 6,300 |
| Commercial product A | 4,200 | 5,600 | 7,800 | 8,000 | 9,200 | 10,500 |
| Commercial product C | 6,200 | 10,500 | 14,500 | 15,500 | 19,000 | 21,500 | in the seeded polymerization. In either case, sol viscosity is very high.

Table 8 shows the results of heat-stability test for cast films with respect to several examples, where sol did not color upon preparation, which are picked up from Table 7. It is apparent that any of the Reference Examples is very inferior to the Examples also in heat-stability.

TABLE 7

Seed polymerization

| | Emulsifier system | | 3rd component, disodium phosphate molar ratio | State of product | Solution viscosity, poise |
|---|---|---|---|---|---|
| | 1st component, lauric acid (parts by weight) | 2nd component (parts by weight) | | | |
| Example 5 | 0.20 | Pronon-201- 0.20 | 2 | Emulsion | 2,530 |
| Reference Example: | | | | | |
| 17 | 0.20 | Glycerol monostearate 0.20 | 2 | ...do...... | 2,095 |
| 18 | 0.20 | Emasol-310- 0.20 | 2 | ...do...... | 2,683 |
| 19 | 0.20 | .....do...................... | 2 | ...do...... | 1,925 |
| 20 | 0.20 | Emulgen-210- 0.20 | 2 | ...do...... | 1,750 |
| 21 | 0.20 | Emulgen-931- 0.20 | 2 | ...do...... | (¹) |
| 22 | 0.20 | Rapisol B80 0.20 | 2 | ...do...... | (¹) |
| 23 | 0.20 | Emal 2F 0.20 | 2 | ...do...... | (¹) |
| 24 | 0.20 | Emulgen-931- 0.20 | 2 | ...do...... | (¹) |
| 25 | 0.20 | Pronon-201- 0.20 | 2 | ...do...... | 2,537 |

Seeded polymerization

| | Emulsifier system | | 3rd component, sodium bicarbonate, molar ratio | Seed polymers (parts by weight) | State of product | Degree of dehydration (percent) | Solution viscosity, poise |
|---|---|---|---|---|---|---|---|
| | 1st component, lauric acid (parts by weight) | 2nd component (parts by weight) | | | | | |
| Example 5 | 0.20 | Pronon-201- 0.20 | 2 | 3 | Salting-out unnecessary. | 82 | 60 |
| Reference example: | | | | | | | |
| 17 | 0.20 | Glycerol monostearate 0.20 | 2 | 3 | ......do..... | 50 | ²145 |
| 18 | 0.20 | Emasol-310- 0.20 | 2 | 3 | ......do..... | 48 | 135 |
| 19 | 0.20 | Emasol-110- 0.20 | 2 | 3 | ......do..... | 53 | 152 |
| 20 | 0.20 | Emulgen-210- 0.20 | 2 | 3 | Salting-out necessary. | 39 | 145 |
| 21 | 0.20 | Emulgen-931- 0.20 | 2 | 3 | ......do..... | 38 | 171 |
| 22 | 0.20 | Rapisol B80 0.20 | 2 | 3 | ......do..... | 32 | ²1,390 |
| 23 | 0.20 | Emal 2F 0.20 | 2 | 3 | ......do..... | 33 | ²1,175 |
| 24 | 0.20 | Pronon-201- 0.20 | 2 | 3 | ......do..... | 53 | 195 |
| 25 | 0.20 | Emal 2F 0.20 | 2 | 3 | ......do..... | 35 | 1,332 |

¹ Too high to be measured.
² Solution colored.

NOTES:
Emasol-310- (Registered trade mark; made by Kao Sekken K.K.): Sorbitan monostearate.
Emasol-110- (Registered trade mark; made by Kao Sekken K.K.): Sorbitan monolaurate.
Emulgen-210- (Registered trade mark; made by Kao Sekken K.K.): Polyoxyethylene cetyl ether.
Emulgen-931- (Registered trade mark; made by Kao Sekken K.K.): Polyoxyethylene nonylphenol ether.
Pronon-201- (Registered trade mark; made by Nippon Yushi K.K.): A high molecular weight active agent represented by the formula $HO(CH_2CH_2O)_m(CHCH_3CH_2O)_p(CH_2CH_2O)_nH$ where m is 2-3, n is 2-3 and p is 34-35.

TABLE 8.—HEAT-STABILITY

| Minutes | 20 | 30 | 40 | 60 | 80 |
|---|---|---|---|---|---|
| Example 5 | White | White | White | Slight brown | Brown |
| Reference example: | | | | | |
| 18 | do | do | Brown spots | Black | Black |
| 19 | do | do | Brown | do | Do. |
| 20 | do | do | do | Dark brown | Do. |
| 21 | do | do | do | Black | Do. |
| 24 | do | Slight yellow | do | do | Do. |
| 25 | do | do | do | do | Do. |

EXAMPLE 6–10 AND REFERENCE EXAMPLES 26–31 (Described in Table 9)

Table 9 demonstrates that polymers of excellent properties can not be obtained in case of replacing the third component of the emulsifier system of the present invention i.e. disodium phosphate or sodium bicarbonate with other inorganic salt in either the seed polymerization or the seeded polymerization, and also that vinyl chloride polymers of improved properties can not be obtained merely by simply adjusting the pH of polymerization medium to the same value as in examples.

TABLE 9

| | Seed polymerization | | | | | |
|---|---|---|---|---|---|---|
| | Emulsifier system | | | State of product | Polymerization liquor pH | Solution viscosity, poise |
| | 1st component (parts by weight) | 2nd component (parts by weight) | 3rd component, molar ratio | | | |
| Example: | | | | | | |
| 6 | Myristic acid 0.25 | Pronon-104- 0.25 | Disodium phosphate 0.5. | Emulsion | 8.5 | 2,425 |
| 7 | Lauric acid 0.14 | Pronon-201- 0.14 | Disodium phosphate 2. | do | 8.5 | 2,150 |
| 8 | do | do | do | do | | 2,150 |
| 9 | do | do | Sodium bicarbonate 2 | do | | 1,865 |
| 10 | do | do | do | do | | 1,865 |
| Reference Example: | | | | | | |
| 26 | do | do | Trisodium phosphate 2. | do | | (1) |
| 27 | do | do | Sodium carbonate 2 | do | | (1) |
| 28 | do | do | Disodium phosphate 2. | do | 8.5 | 2,150 |
| 29 | do | do | Sodium carbonate 1; Monosodium phosphate 1. | do | 8.5 | 2,150 |
| 30 | do | do | Sodium carbonate 2 | do | | (1) |
| 31 | do | do | Disodium phosphate 2. | do | | 2,150 |

| | Seeded polymerization | | | | | | | |
|---|---|---|---|---|---|---|---|---|
| | Emulsifier system | | | Seed polymers (parts by weight) | State of product | Polymerization liquor pH | Degree of dehydration (percent) | Solution viscosity, poise |
| | 1st component (parts by weight) | 2nd component (parts by weight) | 3rd component, molar ratio | | | | | |
| Example: | | | | | | | | |
| 6 | Myristic acid 0.25. | Pronon-104- 0.25 | Sodium bicarbonate 0.5 | 3 | Salting out unnecessary. | 7.5 | 80 | 70 |
| 7 | Lauric acid 0.14 | Pronon-201- 0.14 | Sodium bicarbonate 2 | 3 | do | 7.4 | 82 | 68 |
| 8 | do | do | Disodium phosphate 2 | 3 | do | 8.5 | 36 | 92 |
| 9 | do | do | Sodium bicarbonate 2 | 3 | Salting out unnecessary, small agglomerates formed. | 7.5 | 78 | 120 |
| 10 | do | do | Disodium phosphate 2 | 3 | Salting out unnecessary. | 8.3 | 38 | 125 |
| Reference example: | | | | | | | | |
| 26 | do | do | Trisodium phosphate 2 | 3 | Salting out necessary. | 10.8 | 33 | 369 |
| 27 | do | do | Sodium carbonate 2 | 3 | do | 10.5 | 35 | 579 |
| 28 | do | do | Sodium acetate 2 | 3 | Salting out unnecessary. | 7.3 | 72 | 335 |
| 29 | do | do | do | 3 | Salting out unnecessary. A large quantity of small agglomerates formed. | 7.5 | | (2) |
| 30 | do | do | Sodium bicarbonate 2 | 3 | Salting out necessary. | 8.0 | 49 | 475 |
| 31 | do | do | Trisodium phosphate 2 | 3 | do | 10.0 | 38 | 315 |

[1] Too high to be measured.
[2] No solution formed.

Note.—Pronon-104- (Registered trade mark; made by Nippon Yushi K.K.): A high molecular surface active agent represented by the formula $HO(CH_2CH_2O)_m(CHCH_3CH_2O)_p(CH_2CH_2O)_nH$ where m is 7-8, n is 7-8 and p is 16-18.

REFERENCES EXAMPLES 32–37

(Compared with Example 7) (described in Table 10)

Table 10 demonstrates that the emulsifier system of the present invention requires the simultaneously or jointly using of the three components as an essential condition. When one or two of the three components lack, such desirable polymers as the present invention attains can not be obtained.

In Reference Examples 34–37, the same seed polymers as in Example 7 were used, because use of the similar emulsifier in the seed polymerization as in the seeded polymerization resulted in formation of small agglomerates or hard globular polymers which could not be used as seen polymers.

TABLE 10

| | Seed polymerization | | | | |
|---|---|---|---|---|---|
| | Emulsifier system | | | State of product | Solution viscosity, poise |
| | 1st component, lauric acid (parts by weight) | 2nd component (parts by weight) | 3rd component, molar ratio | | |
| Example: | | | | | |
| 7 | 0.14 | Pronon-201- 0.14 | Disodium phosphate 2 | Emulsion | 2,150 |
| Reference Example: | | | | | |
| 32 | 0.14 | | do | do | 2,053 |
| 33 | 4.0 | | | Ununiform particles. | 2,580 |
| 34 | 0.14 | Pronon-201- 0.14 | Disodium phosphate 2 | Emulsion | 2,150 |
| 35 | 0.14 | do | do | do | 2,150 |
| 36 | 0.14 | do | do | do | 2,150 |
| 37 | 0.14 | do | do | do | 2,150 |

TABLE 10—Continued

| | Emulsifier system | | | | | | |
|---|---|---|---|---|---|---|---|
| | 1st component, lauric acid (parts by weight) | 2nd component (parts by weight) | 3rd component, sodium bicarbonate molar ratio | Seed polymers (parts by weight) | State of product | Degree of dehydration (percent) | Solution viscosity, poise |
| Example: | | | | | Seeded polymerization | | |
| 7 | 0.14 | Pronon-201– 0.14. | 2 | 3 | Salting out unnecessary | 82 | 68 |
| Reference example: | | | | | | | |
| 32 | 0.14 | | 2 | 3 | do | 75 | [1] 160 |
| 33 | 4.0 | | | 3 | do | 73 | 2,020 |
| 34 | 0.14 | | | 3 | Salting out unnecessary. A large quantity of globular polymers formed. | | [2] |
| 35 | | Pronon-201– 0.14. | | 3 | Salting out unnecessary. A large quantity of small agglomerates and globular polymers formed. | | [2] |
| 36 | 0.14 | do | | 3 | do | | [2] |
| 37 | | do | 2 | 3 | do | | [2] |

[1] Solution colored.
[2] No solution formed.

NOTE.—Reference Example 33, Polymerization was conducted under the following conditions; Vinyl chloride monomers: 100 parts by weight; Water: 300 parts by weight; Ammonium persulfate: 0.1 parts by weight; Polymerization temperature: 57° C.

REFERENCE EXAMPLES 38–43

(Compared with Example 7) (described in Table 11)

Table 11 demonstrates that when the amount of using each of the three components of the emulsifier system of the present invention is out of the range specified in the present invention, such excellent vinyl chloride polymers as the present invention attains can not be obtained.

TABLE 11

| | Seed polymerization | | | | |
|---|---|---|---|---|---|
| | Emulsifier system | | | | |
| | 1st component, lauric acid (parts by weight) | 2nd component, Pronon-201- (parts by weight) | 3 component, disodium phosphate, molar ratio | State of product | Solution viscosity, poise |
| Example 7 | 0.14 | 0.14 | 2 | Emulsion | 2,150 |
| Reference Example: | | | | | |
| 38 | 0.30 | 0.14 | 2 | do | 2,420 |
| 39 | 0.02 | 0.14 | 2 | Ununiform particles | 1,855 |
| 40 | 0.14 | 0.30 | 2 | Emulsion | 2,360 |
| 41 | 0.14 | 0.02 | 2 | do | 3,100 |
| 42 | 0.14 | 0.14 | 6 | do | 2,480 |
| 43 | 0.14 | 0.14 | 0.2 | Ununiform particles | 1,935 |

| | Seeded polymerization | | | | | | |
|---|---|---|---|---|---|---|---|
| | Emulsifier system | | | | | | |
| | 1st component, lauric acid (parts by weight) | 2nd component, Pronon-201- (parts by weight) | 3rd component, sodium bicarbonate molar ratio | Seed polymer (parts by weight) | State of product | Degree of dehydration (percent) | Solution viscosity, poise |
| Example 7 | 0.14 | 0.14 | 2 | 3 | Salting-out unnecessary. | 82 | 68 |
| Reference Example: | | | | | | | |
| 38 | 0.30 | 0.14 | 2 | 3 | Salting-out necessary. | 48 | 183 |
| 39 | 0.02 | 0.14 | 2 | 3 | Salting-out unnecessary. | 63 | 1,125 |
| 40 | 0.14 | 0.30 | 2 | 3 | do | 60 | 138 |
| 41 | 0.14 | 0.02 | 2 | 3 | Salting-out necessary. | 38 | 170 |
| 42 | 0.14 | 0.14 | 6 | 3 | do | 36 | 135 |
| 43 | 0.14 | 0.14 | 0.2 | 3 | Salting-out unnecessary. | 60 | 1,065 |

EXAMPLE 11

(Described in Table 12)

Table 12 demonstrates that also when the emulsifier system of the present invention is applied to copolymerization of monomeric vinyl chloride with other comonomers, copolymers which are quite satisfactory in viscosity and other properties can be obtained.

ployed, as the (b) component, a high molecular surface active agent represented by a formula $$HO(CH_2CH_2O)_m(CHCH_3CH_2O)_p(CH_2CH_2O)_nH$$

where $m$ is 2–16, $n$ is 2–16 and $p$ is 16–35.

TABLE 12

| | Seed polymerization | | | | | |
|---|---|---|---|---|---|---|
| | Emulsifier system | | | | | |
| | 1st component (parts by weight) | 2nd component (parts by weight) | 3rd component, molar ratio | Comonomers (parts by weight) | State of product | Solution viscosity, poise |
| Example 11 | Lauric acid 0.12 | Pronon-102- 0.12 | Disodium phosphate 2 | Dilauryl maleate 5 | Emulsion | 2,360 |

| | Seeded polymerization | | | | | | |
|---|---|---|---|---|---|---|---|
| | Emulsifier system | | | Polymerization copolymerizing monomer (parts by weight) | Seed polymer (parts by weight) | | |
| | 1st component (parts by weight) | 2nd component (parts by weight) | 3rd component, molar ratio | | | State of product | Degree of dehydration (percent) | Solution viscosity, poise |
| Example 11 | Lauric acid 0.12. | Pronon-102- 0.12. | Sodium bicarbonate 2. | Dilauryl maleate 5 | 3 | Salting-out unnecessary. | 80 | 75 |

What is claimed is:
1. A process for the preparation of vinyl chloride polymers which comprises the first step of polymerizing monomers of vinyl chloride in an aqueous medium in the presence of a water-soluble polymerization initiator to prepare seed polymers and the second step of polymerizing fresh monomers of vinyl chloride using the said seed polymers as seeds in an aqueous medium in the presence of a water-soluble polymerization initiator to produce the final product polymers, in each of which steps respectively is used an emulsifier system comprising (a) 0.03–0.25 part by weight of higher fatty acid of carbon number of 10–18 per 100 parts by weight of the monomers, (b) 0.03–0.25 part by weight of a high molecular surface active agent represented by the formula

$$HO(CH_2CH_2O)_m(CHCH_3CH_2O)_p(CH_2CH_2O)_nH$$

per 100 parts by weight of the monomers and (c) 0.5–5 mols of a member selected from the group consisting of disodium phosphate and sodium bicarbonate per 1 mol of (a) component.

2. A process according to claim 1 wherein as the (c) component of the said emulsifier system, ($c_1$) sodium phosphate is employed in the first step and ($c_2$) sodium bicarbonate is employed in the second step, respectively.

3. A process according to claim 1 wherein there is employed, as the (b) component, a high molecular surface active agent represented by a formula 4. A process according to claim 1 wherein the monomers of vinyl chloride are replaced by mixed monomers of vinyl chloride and at least one selected from the other compounds copolymerizable with vinyl chloride and copolymers of vinyl chloride are produced.

5. A process according to claim 4 wherein the other compounds are vinylidene chloride, alkyl vinyl esters, alkyl vinyl ethers, alkyl acrylates, alkyl methacrylates, alkyl unsaturated dibasic acid esters and olefins.

6. A process according to claim 4 wherein the amount of monomers of the other compounds are at most 30% by weight on the basis of the combined monomers.

7. A process according to claim 1 wherein the water-soluble polymerization initiator is an inorganic peroxide.

8. A process according to claim 1 wherein the water-soluble polymerization initiator is a redox catalyst consisting of an inorganic peroxide and a reducing agent.

References Cited

UNITED STATES PATENTS 3,370,028  2/1968  De Wald et al. _____ 260—92.8
3,485,811  12/1969  Levine et al. _____ 260—92.8

JOSEPH L. SCHOFER, Primary Examiner
J. A. DONAHUE, JR., Assistant Examiner

U.S. Cl. X.R.
260—92.8